United States Patent
Bachelder et al.

(10) Patent No.: US 6,748,104 B1
(45) Date of Patent: Jun. 8, 2004

(54) METHODS AND APPARATUS FOR MACHINE VISION INSPECTION USING SINGLE AND MULTIPLE TEMPLATES OR PATTERNS

(75) Inventors: Ivan Bachelder, Natick, MA (US); Aaron Wallack, Newton Highlands, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/535,633

(22) Filed: Mar. 24, 2000

(51) Int. Cl.[7] .............................. G06K 9/00; G06K 9/62
(52) U.S. Cl. ..................... 382/151; 382/147; 382/149; 382/209
(58) Field of Search .................................. 382/151, 147, 382/149, 145, 209, 181; 348/129, 130, 95

(56) References Cited

U.S. PATENT DOCUMENTS

| | | |
|---|---|---|
| 3,816,722 A | 6/1974 | Sakoe et al. |
| 3,936,800 A | 2/1976 | Ejiri et al. |
| 3,967,100 A | 6/1976 | Shimomura |
| 3,968,475 A | 7/1976 | McMahon |
| 3,978,326 A | 8/1976 | Shimomura |
| 4,011,403 A | 3/1977 | Epstein et al. |
| 4,115,702 A | 9/1978 | Nopper |
| 4,115,762 A | 9/1978 | Akiyama et al. |
| 4,183,013 A | 1/1980 | Agrawala et al. |
| 4,200,861 A | 4/1980 | Hubach et al. |
| 4,254,400 A | 3/1981 | Yoda et al. |
| 4,286,293 A | 8/1981 | Jablonowski |
| 4,300,164 A | 11/1981 | Sacks |
| 4,385,322 A | 5/1983 | Hubach et al. |
| 4,435,837 A | 3/1984 | Abernathy |
| 4,441,124 A | 4/1984 | Heebner et al. |
| 4,441,206 A | 4/1984 | Kuniyoshi et al. |
| 4,519,041 A | 5/1985 | Fant et al. |
| 4,534,813 A | 8/1985 | Williamson et al. |
| 4,541,116 A | 9/1985 | Lougheed |
| 4,570,180 A | 2/1986 | Baier et al. |

(List continued on next page.)

FOREIGN PATENT DOCUMENTS

| | | |
|---|---|---|
| EP | 0 527 632 A2 | 2/1993 |
| EP | 0 777 381 A2 | 11/1996 |
| WO | WO 95/21376 | 8/1995 |
| WO | WO 95/22137 | 8/1995 |
| WO | WO 97/21189 | 6/1997 |
| WO | WO 97/22858 | 6/1997 |
| WO | WO 97/24692 | 7/1997 |
| WO | WO 97/24693 | 7/1997 |
| WO | WO 98/52349 | 11/1998 |
| WO | WO 98/59490 | 12/1998 |
| WO | WO 99/15864 | 4/1999 |

OTHER PUBLICATIONS

Ji et al., "Machine Interpretation of CAD Data for Manufacturing Applications," ACM Computing Surveys, vol. 24, No. 3, 1997, pp. 264–311.*

(List continued on next page.)

*Primary Examiner*—Mehrdad Dastouri
*Assistant Examiner*—Virginia Kibler
(74) *Attorney, Agent, or Firm*—David J. Powsner

(57) ABSTRACT

A method for rapid determination of the position and/or orientation of a semiconductor device, electronic component or other object includes performing multiple times an operation of matching a pattern against an image. The matching operation finds the location, if any, of a respective pattern in the image and determines the degree of match. The position and orientation of the object is determined from the results of one of the matching operations, for example, from the operation that revealed the highest degree of match.

11 Claims, 5 Drawing Sheets

U.S. PATENT DOCUMENTS

| | | |
|---|---|---|
| 4,577,344 A | 3/1986 | Warren et al. |
| 4,581,762 A | 4/1986 | Lapidus et al. |
| 4,606,065 A | 8/1986 | Beg et al. |
| 4,617,619 A | 10/1986 | Gehly |
| 4,630,306 A | 12/1986 | West et al. |
| 4,631,750 A | 12/1986 | Gabriel et al. |
| 4,641,349 A | 2/1987 | Flom et al. |
| 4,688,088 A | 8/1987 | Hamazaki et al. |
| 4,706,168 A | 11/1987 | Weisner |
| 4,707,647 A | 11/1987 | Coldren et al. |
| 4,728,195 A | 3/1988 | Silver |
| 4,730,260 A | 3/1988 | Mori et al. |
| 4,731,858 A | 3/1988 | Grasmueller et al. |
| 4,736,437 A | 4/1988 | Sacks et al. |
| 4,742,551 A | 5/1988 | Deering |
| 4,752,898 A | 6/1988 | Koenig |
| 4,758,782 A | 7/1988 | Kobayashi |
| 4,764,870 A | 8/1988 | Haskin |
| 4,771,469 A | 9/1988 | Wittenburg |
| 4,776,027 A | 10/1988 | Hisano et al. |
| 4,782,238 A | 11/1988 | Radl et al. |
| 4,783,826 A | 11/1988 | Koso |
| 4,783,828 A | 11/1988 | Sadjadi |
| 4,783,829 A | 11/1988 | Miyakawa et al. |
| 4,809,077 A | 2/1989 | Norita et al. |
| 4,821,333 A | 4/1989 | Gillies |
| 4,831,580 A | 5/1989 | Yamada |
| 4,860,374 A | 8/1989 | Murakami et al. |
| 4,860,375 A | 8/1989 | McCubbrey et al. |
| 4,876,457 A | 10/1989 | Bose |
| 4,876,728 A | 10/1989 | Roth |
| 4,891,767 A | 1/1990 | Rzasa et al. |
| 4,903,218 A | 2/1990 | Longo et al. |
| 4,907,169 A | 3/1990 | Lovoi |
| 4,908,874 A | 3/1990 | Gabriel |
| 4,912,559 A | 3/1990 | Ariyoshi et al. |
| 4,912,659 A | 3/1990 | Liang |
| 4,914,553 A | 4/1990 | Hamada et al. |
| 4,922,543 A | 5/1990 | Ahlbom et al. |
| 4,926,492 A | 5/1990 | Tanaka et al. |
| 4,932,065 A | 6/1990 | Feldgajer |
| 4,953,224 A | 8/1990 | Ichinose et al. |
| 4,955,062 A | 9/1990 | Terui |
| 4,959,898 A | 10/1990 | Landman et al. |
| 4,962,423 A | 10/1990 | Yamada et al. |
| 4,972,359 A | 11/1990 | Silver et al. |
| 4,982,438 A | 1/1991 | Usami et al. |
| 5,012,402 A | 4/1991 | Akiyama |
| 5,012,524 A | 4/1991 | Le Beau |
| 5,027,419 A | 6/1991 | Davis |
| 5,046,190 A | 9/1991 | Daniel et al. |
| 5,054,096 A | 10/1991 | Beizer |
| 5,060,276 A | 10/1991 | Morris et al. |
| 5,063,608 A | 11/1991 | Siegel |
| 5,073,958 A | 12/1991 | Imme |
| 5,081,656 A | 1/1992 | Baker et al. |
| 5,081,689 A | 1/1992 | Meyer et al. |
| 5,086,478 A | 2/1992 | Kelly-Mahaffey et al. |
| 5,090,576 A | 2/1992 | Menten |
| 5,091,861 A | 2/1992 | Geller et al. |
| 5,091,968 A | 2/1992 | Higgins et al. |
| 5,093,867 A | 3/1992 | Hori et al. |
| 5,113,565 A | 5/1992 | Cipolla et al. |
| 5,115,309 A | 5/1992 | Hang |
| 5,119,435 A | 6/1992 | Berkin |
| 5,124,622 A | 6/1992 | Kawamura et al. |
| 5,133,022 A | 7/1992 | Weideman |
| 5,134,575 A | 7/1992 | Takagi |
| 5,143,436 A | 9/1992 | Baylor et al. |
| 5,145,432 A | 9/1992 | Midland et al. |
| 5,151,951 A | 9/1992 | Ueda et al. |
| 5,153,925 A | 10/1992 | Tanioka et al. |
| 5,155,775 A | 10/1992 | Brown |
| 5,159,281 A | 10/1992 | Hedstrom et al. |
| 5,159,645 A | 10/1992 | Kumagai |
| 5,164,994 A | 11/1992 | Bushroe |
| 5,168,269 A | 12/1992 | Harlan |
| 5,175,808 A | 12/1992 | Sayre |
| 5,179,419 A | 1/1993 | Palmquist et al. |
| 5,185,810 A | 2/1993 | Freischlad |
| 5,185,855 A | 2/1993 | Kato et al. |
| 5,189,712 A | 2/1993 | Kajiwara et al. |
| 5,206,820 A | 4/1993 | Ammann et al. |
| 5,216,503 A | 6/1993 | Paik |
| 5,225,940 A | 7/1993 | Ishii et al. |
| 5,230,027 A | 7/1993 | Kikuchi |
| 5,243,607 A | 9/1993 | Masson et al. |
| 5,253,306 A | 10/1993 | Nishio |
| 5,253,308 A | 10/1993 | Johnson |
| 5,265,173 A | 11/1993 | Griffin et al. |
| 5,271,068 A | 12/1993 | Ueda et al. |
| 5,287,449 A | 2/1994 | Kojima |
| 5,297,238 A | 3/1994 | Wang et al. |
| 5,297,256 A | 3/1994 | Wolstenholme et al. |
| 5,299,269 A | 3/1994 | Gaborski et al. |
| 5,307,419 A | 4/1994 | Tsujino et al. |
| 5,311,598 A | 5/1994 | Bose et al. |
| 5,315,388 A | 5/1994 | Shen et al. |
| 5,319,457 A | 6/1994 | Nakahashi et al. |
| 5,327,156 A | 7/1994 | Masukane et al. |
| 5,329,469 A | 7/1994 | Watanabe |
| 5,337,262 A | 8/1994 | Luthi et al. |
| 5,337,267 A | 8/1994 | Colavin |
| 5,363,507 A | 11/1994 | Nakayama et al. |
| 5,367,439 A | 11/1994 | Mayer et al. |
| 5,367,667 A | 11/1994 | Wahlquist et al. |
| 5,371,690 A | 12/1994 | Engel et al. |
| 5,388,197 A | 2/1995 | Rayner |
| 5,388,252 A | 2/1995 | Dreste et al. |
| 5,398,292 A | 3/1995 | Aoyama |
| 5,432,525 A | 7/1995 | Maruo et al. |
| 5,440,699 A | 8/1995 | Farrand et al. |
| 5,455,870 A | 10/1995 | Sepai et al. |
| 5,455,933 A | 10/1995 | Schieve et al. |
| 5,471,312 A | 11/1995 | Watanabe et al. |
| 5,475,766 A | 12/1995 | Tsuchiya et al. |
| 5,475,803 A | 12/1995 | Stearns et al. |
| 5,477,138 A | 12/1995 | Erjavic et al. |
| 5,481,712 A | 1/1996 | Silver et al. |
| 5,485,570 A | 1/1996 | Busboom et al. |
| 5,491,780 A | 2/1996 | Fyles et al. |
| 5,495,424 A | 2/1996 | Tokura |
| 5,495,537 A | 2/1996 | Bedrosian et al. |
| 5,496,106 A | 3/1996 | Anderson |
| 5,500,906 A | 3/1996 | Picard et al. |
| 5,506,617 A | 4/1996 | Parulski et al. |
| 5,506,682 A | 4/1996 | Pryor |
| 5,511,015 A | 4/1996 | Flockencier |
| 5,519,840 A | 5/1996 | Matias et al. |
| 5,526,050 A | 6/1996 | King et al. |
| 5,528,703 A | 6/1996 | Lee |
| 5,532,739 A | 7/1996 | Garakani et al. |
| 5,539,409 A | 7/1996 | Mathews et al. |
| 5,544,256 A | 8/1996 | Brecher et al. |
| 5,548,326 A | 8/1996 | Michael |
| 5,550,763 A | 8/1996 | Michael |
| 5,550,888 A | 8/1996 | Neitzel et al. |
| 5,553,859 A | 9/1996 | Kelly et al. |
| 5,557,410 A | 9/1996 | Huber et al. |
| 5,557,690 A | 9/1996 | O'Gorman et al. |
| 5,566,877 A | 10/1996 | McCormack |

| | | |
|---|---|---|
| 5,568,563 A | 10/1996 | Tanaka et al. |
| 5,574,668 A | 11/1996 | Beaty |
| 5,574,801 A | 11/1996 | Collet-Beillon |
| 5,581,632 A | 12/1996 | Koljonen et al. |
| 5,583,949 A | 12/1996 | Smith et al. |
| 5,583,954 A | 12/1996 | Garakani |
| 5,586,058 A | 12/1996 | Aloni et al. |
| 5,592,562 A | 1/1997 | Rooks |
| 5,594,859 A | 1/1997 | Palmer et al. |
| 5,602,937 A * | 2/1997 | Bedrosian et al. .......... 382/151 |
| 5,608,490 A | 3/1997 | Ogawa |
| 5,608,872 A | 3/1997 | Schwartz et al. |
| 5,627,915 A * | 5/1997 | Rosser et al. ............... 382/219 |
| 5,640,199 A | 6/1997 | Garakani et al. |
| 5,640,200 A | 6/1997 | Michael |
| 5,642,158 A | 6/1997 | Petry, III et al. |
| 5,647,009 A | 7/1997 | Aoki et al. |
| 5,649,032 A | 7/1997 | Burt et al. |
| 5,657,403 A | 8/1997 | Wolff et al. |
| 5,673,334 A | 9/1997 | Nichani et al. |
| 5,676,302 A | 10/1997 | Petry, III |
| 5,696,848 A | 12/1997 | Patti et al. |
| 5,715,369 A | 2/1998 | Spoltman et al. |
| 5,715,385 A | 2/1998 | Stearns et al. |
| 5,717,785 A | 2/1998 | Silver |
| 5,724,439 A | 3/1998 | Mizuoka et al. |
| 5,740,285 A | 4/1998 | Bloomberg et al. |
| 5,742,037 A | 4/1998 | Scola et al. |
| 5,751,853 A | 5/1998 | Michael |
| 5,754,679 A | 5/1998 | Koljonen et al. |
| 5,757,956 A | 5/1998 | Koljonen et al. |
| 5,761,326 A | 6/1998 | Brady et al. |
| 5,761,337 A | 6/1998 | Nishimura et al. |
| 5,768,443 A | 6/1998 | Michael et al. |
| 5,793,899 A | 8/1998 | Wolff et al. |
| 5,796,386 A | 8/1998 | Lipscomb et al. |
| 5,796,868 A | 8/1998 | Dutta-Choudhury |
| 5,801,966 A | 9/1998 | Ohashi |
| 5,805,722 A | 9/1998 | Cullen et al. ............... 382/146 |
| 5,809,658 A | 9/1998 | Jackson et al. |
| 5,818,443 A | 10/1998 | Schott |
| 5,822,055 A | 10/1998 | Tsai et al. |
| 5,825,483 A | 10/1998 | Michael et al. |
| 5,825,913 A | 10/1998 | Rostami et al. |
| 5,835,099 A | 11/1998 | Marimont |
| 5,835,622 A | 11/1998 | Koljonen et al. |
| 5,845,007 A | 12/1998 | Ohashi et al. |
| 5,848,189 A | 12/1998 | Pearson et al. |
| 5,850,466 A | 12/1998 | Schott |
| 5,859,923 A | 1/1999 | Petry, III et al. |
| 5,861,909 A | 1/1999 | Garakani et al. |
| 5,872,870 A | 2/1999 | Michael |
| 5,878,152 A | 3/1999 | Sussman |
| 5,900,975 A | 5/1999 | Sussman |
| 5,901,241 A | 5/1999 | Koljonen et al. |
| 5,909,504 A | 6/1999 | Whitman |
| 5,912,768 A | 6/1999 | Sissom et al. |
| 5,912,984 A | 6/1999 | Michael et al. |
| 5,918,196 A | 6/1999 | Jacobson |
| 5,933,523 A | 8/1999 | Drisko et al. |
| 5,943,441 A | 8/1999 | Michael |
| 5,974,169 A | 10/1999 | Bachelder |
| 5,978,502 A | 11/1999 | Ohashi ....................... 382/147 |
| 6,002,738 A | 12/1999 | Cabral et al. |
| 6,005,965 A | 12/1999 | Tsuda et al. ................ 382/145 |
| 6,016,152 A | 1/2000 | Dickie |
| 6,026,176 A | 2/2000 | Whitman .................... 382/146 |
| 6,151,406 A | 11/2000 | Chang et al. ............... 382/147 |
| 6,173,070 B1 | 1/2001 | Michael et al. ............. 382/145 |
| 6,307,210 B1 | 10/2001 | Suzuki et al. .......... 250/559.08 |
| 6,396,942 B1 | 5/2002 | Chang et al. ............... 382/141 |
| 6,442,291 B1 | 8/2002 | Whitman .................... 382/141 |
| 6,477,275 B1 * | 11/2002 | Melikian et al. ............ 382/217 |
| 6,516,092 B1 * | 2/2003 | Bachelder et al. .......... 382/181 |
| 6,526,165 B1 | 2/2003 | Montillo et al. ............ 382/145 |
| 6,577,758 B1 | 6/2003 | Kawata et al. .............. 382/151 |
| 6,614,926 B1 | 9/2003 | Fix et al. .................... 382/150 |

OTHER PUBLICATIONS

Vandenbrande et al., "Spatial reasoning for the automatic recognition of machinable features in solid models," IEEE, vol. 15, No. 12, 1993, pp. 1269–1285.*

Bursky, Dave, "CMOS Four–Chip Set Process Images at 20–MHz Data Rates," Electronic Design, May 28, 1987, pp. 39–44.

Chapter 3: "Guidelines for Developing MMX Code," Intel.

Chapter 4: "MMX Code Development Strategy," Intel.

Chapter 5: "MMX Coding Techniques," Intel.

Chapter 3: "Optimization Techniques for Integer Blended Code," Intel.

"Geometrical Image Modification," pp. 421–442.

Gevorkian David Z., Astola Jaakko T., and Atourian Samvel M. "Improving Gil–Werman Algorithm for Running Min and Max Filters" IEEE Transactions on Pattern Analysis and Machine Intelligence, vol. 19, No. 5, May 1997, pp. 526–529.

Gil, Joseph and Werman Michael. "Computing 2–D Min, Median, and Max Filters" IEEE Transactions on Pattern Analysis and Machine Intelligence, vol. 15, No. 5, May 1993, pp. 504–507.

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Horn, Berthold Klaus Paul. "Robot Vision", The Massachusetts Institute for Technology, 1986.

Medina–Mora et al. (1981) An Incremental Programming Environment, IEEE Transactions on Software Eng. SE–7:472–482.

NEC Electronics Inc., PD7281 Image Pipelined Processor, Product Information Brochure, pp. 2–169–2–211.

Newsletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Product Brochure "Picturetel System 1000: Complete Videoconferencing for Cost Sensitive Applications," 4 pp. (1993).

PictureTel Corporation Product Brochure, "Picturetel System 4000(tm) A Family of Models to Fit Your Application From Offices to Boardrooms, Classrooms, and Auditoriums," 4 pp. (1993).

Plessey Semiconductors, Preliminary Information, May 1986, Publication No. PS2067, May 1986, pp. 1–5.

Pratt, William K. Digital Image Processing (2nd Ed.), 1991, pp. 421–445.

Racca Roberto G., Stephenson Owen, and Clements Reginald M. High–speed video analysis system using multiple shuttered charge–coupled device imagers and digital storage. Optical Engineering (Jun. 1992) 31;6.

Ray, R. "Automated inspection of solder bumps using visual signatures of specular image–highlights," Computer Vision and Pattern Recognition, 1989. Proceedings CVPR '89. pp. 588–596.

Rosenfeld, Azriel. "Computer Vision: Basic Principles," Proceedings of the IEEE. vol. 76, No. 8, Aug. 1988. pp. 863–868.

Symantec Corporation, "The Norton pcAnywhere User's Guide," Table of Contents 8 pp; Introduction of pcAnywhere Technology pp i–vii; Chapter 7—Sessions; pp. 191–240 (1991).

Teitelbaum et al. (19810 The Cornell Program Synthesizer: A Syntax–Directed Programming Environment, Communications of the ACM 24:563–573.

Tsai, Roger Y. "A Versatile Camera Calibration Technique for High–Accuracy 3D Mahcine Vision Metrology Using Off–the–Shelf TV Cameras and Lenses," The Journal of Robotics and Automation, vol. RA–3, No. 4, Aug. 1987, pp. 323–344.

Tsai, Roger Y. "An Efficient and Accurate Camera Calibration Technique for 3D Machine Vision," Proceedings IEEE Conference on Computer Vision and Pattern Recognition Jun. 22–26, 1986, pp. 364–374.

Turney, Jerry L. "Recognizing Partially Occluded Parts," IEEE Transactions on Pattern Analysis and Machine Intelligence, PAMI–7 (1985) Jul., No. 4, pp. 410–421.

Unser, Michael. "Convolution–Based Interpolation for Fast, High–Quality Rotation of Images," IEEE Transactions on Image Processing vol. 4 No. 10 (Oct. 1995) pp. 1371–1381.

Viitanen, Jouko, et al. "Hierarchical pattern matching with an efficient method for estimating rotations," Proceedings IECON '87 International Conference on Industrial Electronics, Control, and Instrumentation, Nov. 3–6, 1987, 6 pp.

Wu, Yifeng and Maitre, Henri. "Registration of a SPOT Image and a SAR Image Using Multiresolution Representation of a Coastline," 10th International Conference on Pattern Recognition Jun. 16–21, 1990, pp. 913–917.

* cited by examiner

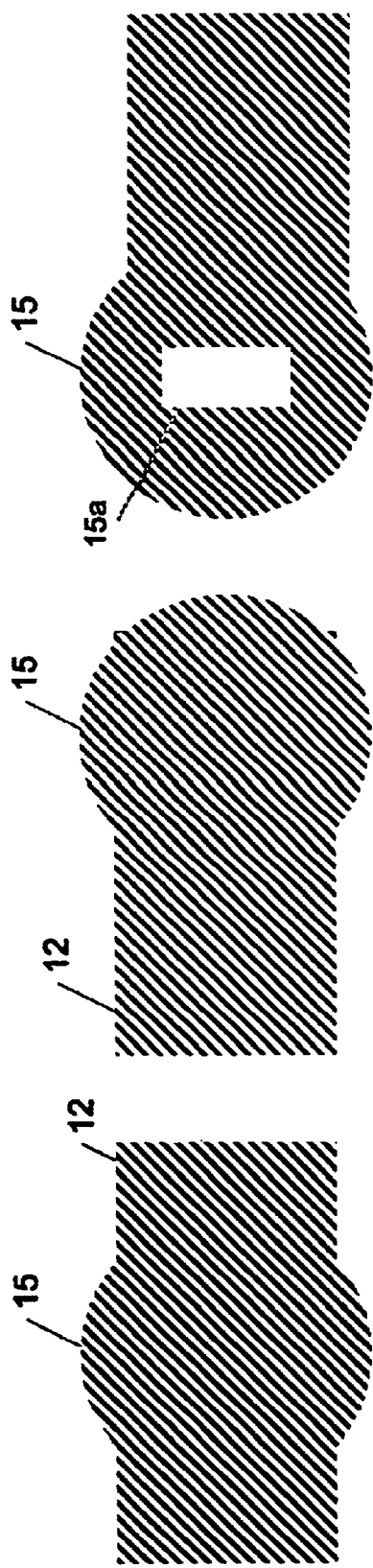
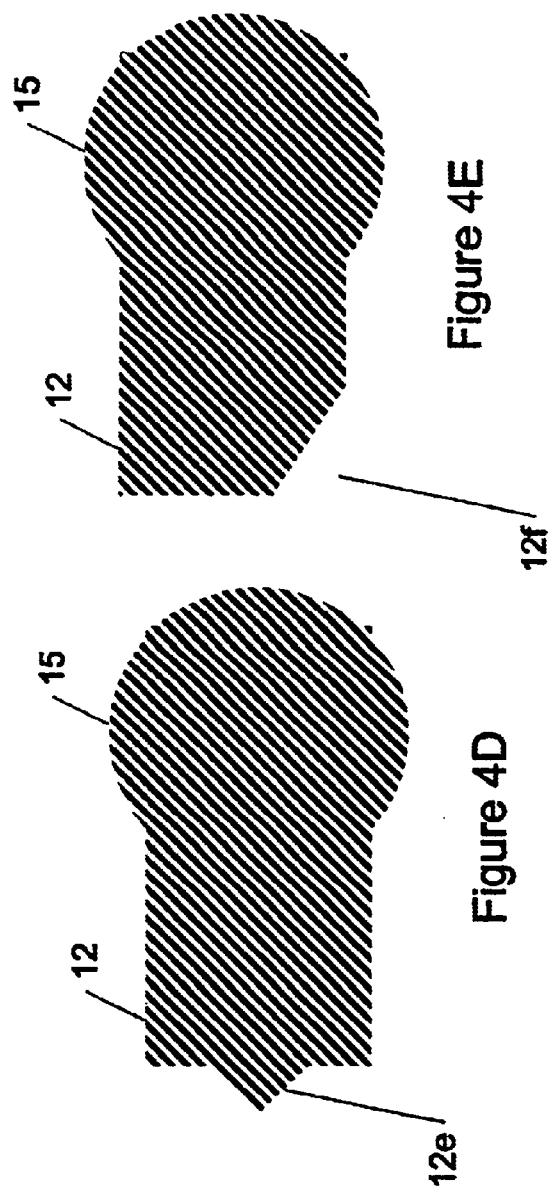
Figure 4A
Figure 4B
Figure 4C
Figure 4D
Figure 4E

METHODS AND APPARATUS FOR MACHINE VISION INSPECTION USING SINGLE AND MULTIPLE TEMPLATES OR PATTERNS

BACKGROUND OF THE INVENTION

The invention pertains to machine vision and, more particularly, to the inspection of electronic components and other objects. The invention has application in semiconductor device fabrication and electronic parts assembly, among others.

Machine vision refers to the automated analysis of an image to determine characteristics of objects and other features shown in the image. It is often employed in automated manufacturing lines, where images of components are analyzed to determine placement prior to assembly.

In the semiconductor and electronics industries, for example, machine vision is used to determine the position and orientation of semiconductor chips and other components before they are soldered into place on printed circuit boards. Typically, this is done by examining edges revealed in back-lit or silhouette images of the chips. This can be difficult, because the visual features (e.g., edge points) present in those images must be matched against internal models of the chips or other components. Nonetheless, it is necessary to permit accurate transformations from model to physical coordinates (i.e., the physical position of the chip). The process must be fast, moreover, so that automated equipment can perform up to speed. It must also be accurate enough, for example, to insure that chip leads make proper contact with boards or any other devices to which they are assembled.

The automated handling of semiconductor chips and other components further complicates machine vision processing of their images. Like other delicate electronic components, chips are typically manipulated during assembly by suction nozzles. These small vacuum tips are used to pick the chips out of bins, present them for inspection to the machine vision system, and place them on boards. Although the nozzles are usually arranged to pick up the chips from behind, they often protrude beyond the edges and, thereby, add extraneous features and complexity to the chip images. In some instances, corners or edges of the chips may be pulled unevenly into the nozzles, further complicating position analysis and subjecting the nozzles themselves to potential damage.

One technique for chip inspection is described in commonly assigned U.S. Pat. No. 5,974,169, entitled MACHINE VISION METHODS FOR DETERMINING CHARACTERISTICS OF AN OBJECT USING BOUNDARY POINTS AND BOUNDING REGIONS, filed Mar. 20, 1997. While this technique, as well as others by the Assignee hereof, have proven highly successful, there remains a need for still further methodologies suited to chip and other inspection applications.

An object of this invention is to provide improved methods and apparatus for machine vision.

A more particular object is to provide such methods and apparatus as permit the rapid, accurate and/or low-cost determination of object position and/or orientation.

A further object of the invention is to provide such methods and apparatus as facilitate the inspection of electronic and other parts during assembly or other automated operations.

Still further objects of the invention are to provide such methods and apparatus as require minimal computational resources.

Yet a still further object of the invention is to provide methods and apparatus as can be readily adapted to operate with existing digital data processing apparatus, regardless of whether designed for general purpose or special purpose machine vision applications.

SUMMARY OF THE INVENTION

The aforementioned objects are among those attained by the invention which provides, inter alia, machine vision methods for determining the location and orientation of objects in images.

Such methods, according to one aspect of invention, include performing multiple times an operation of matching a pattern against an image. The matching operation finds the location, if any, of a respective pattern in the image and determines the degree of match. The position and orientation of the object is determined from the results of one of the matching operations, for example, from the operation that revealed the highest degree of match.

Each pattern, in a method as described above, models one or more respective portions (e.g., edges) of the object. Each time the matching operation is performed (i.e., with respect to determining the location and orientation of a given object), a different pattern is applied. Though the patterns differ, they may model common portions of the object. Thus, for example, a first pattern may model a first side of the object; a second pattern may model a second, opposite side of the object; and, a third pattern may model both the first and second sides of the object.

The patterns are selected, according to a related aspect of the invention, so that at least one of them, individually, or two or more of them, in combination, matches (e.g., with an acceptably high degree of matching) at least a majority—if not substantially all—of expected imaged portions of the object under expected conditions of execution of the method. Thus, for example, if the method is executed for purposes of determining the position and orientation of a semiconductor chip that is presented by a suction nozzle, the three exemplary patterns discussed in the preceding paragraph could be gainfully selected. This is so because, under normal circumstances and assuming proper pickup, at least one of those patterns individually (or two or more, in combination) will match substantially all portions of the chip that are not obscured by the nozzle in a backlit (e.g., silhouette) image and, therefore, will provide a basis for position/location determination. This is true regardless of whether the suction nozzle lands in the middle of the chip or toward either side.

Further aspects of the invention provide methods as discussed above where the position and/or orientation of the object are determined, not necessarily from the pattern that produced the highest degree of match in a matching operation, but from other factors in addition or instead. One such factor is a characteristic of the pattern being matched. Continuing the above example, a method employing the three aforementioned patterns (a first modeling a first side of the object, a second modeling a second side, and a third modeling both the first and second sides) may base a position/orientation determination on the third pattern so long as it achieves at least a minimal degree of matching, even if it produces a lower matching score than the other two patterns.

Yet still further aspects of the invention provide methods as described above adapted to determine the position and/or orientation of a square, rectangular or other generally rectilinear object, such as—by way of non-limiting example—a semiconductor chip or other electronic circuit component. In these aspects, the patterns that are matched against the image are "side regions" of the objects.

A side region, as used herein, is the border or edge on a side of the object and on nearby portions of one or two adjacent sides. A side region may include—in addition to or instead of nearby portions of one or two adjacent sides—borders or edges of corners that define the transition to such adjacent sides. Thus, for example, the position and/or orientation of a square, rectangular or other rectilinear component can be determined using patterns that model, individually and together, two opposing side regions of the component.

Further aspects of the invention provide methods as described above including the step of inspecting the image to determine the condition of the object. According to these aspects, a position/orientation determination that is based on a match with a first of the patterns can be rejected in favor of a determination based on another of the patterns, e.g., if the inspection suggests that results from the first pattern are likely to be erroneous (notwithstanding the apparent degree of match between that pattern and the image).

Related aspects of the invention provide for rejecting a determination of position and/or orientation altogether, e.g., if inspection reveals that an imaged part is defective or, in the case of parts manipulated by suction nozzles or other handling apparatus, that the part is being held at such an angle as to preclude any reasonable determination of position/orientation. In the latter regard, methods according to the invention can include detecting missing or unexpected corners of the imaged object (either of which can reflect, for example, a miscue—such as a "tombstone" or "billboard" pickup); detecting uneven or unexpected orientations of edges shown in the image (which, too, can reflect a miscue); and/or detecting unexpected edges internal to the imaged object.

Still further aspects of the invention provide methods as described above in which the component whose position and/or orientation to be determined is backlit for purposes of imaging. Related aspects provide methods in which the aforementioned patterns are generated by backlighting sample components. Alternatively, or in addition, those templates may be generated "synthetically," e.g., from mathematical, algorithmic, symbolic or other descriptions of the components whose positions and/or orientations are to be determined.

These and other aspects of the invention are evident in the drawings and in the description that follows. In these and other regards the invention has application a wide variety of industrial, manufacturing, and production environments. It facilitates the rapid determination, from an image, of the position and/or orientation of semiconductor chip, electronic component, or other object. It also provides for inspection of such an object. This information can be used outright or as a first stage to making a more accurate determination of position, orientation and/or condition of the object.

BRIEF DESCRIPTION OF THE DRAWINGS

A more complete understanding of the invention may be attained by reference to the drawings, in which:

FIGS. 4A–4E depict images of the type analyzed by the invention, e.g., evidencing a good or bad pickup conditions.

DETAILED DESCRIPTION OF THE ILLUSTRATED EMBODIMENT

Figure 1:
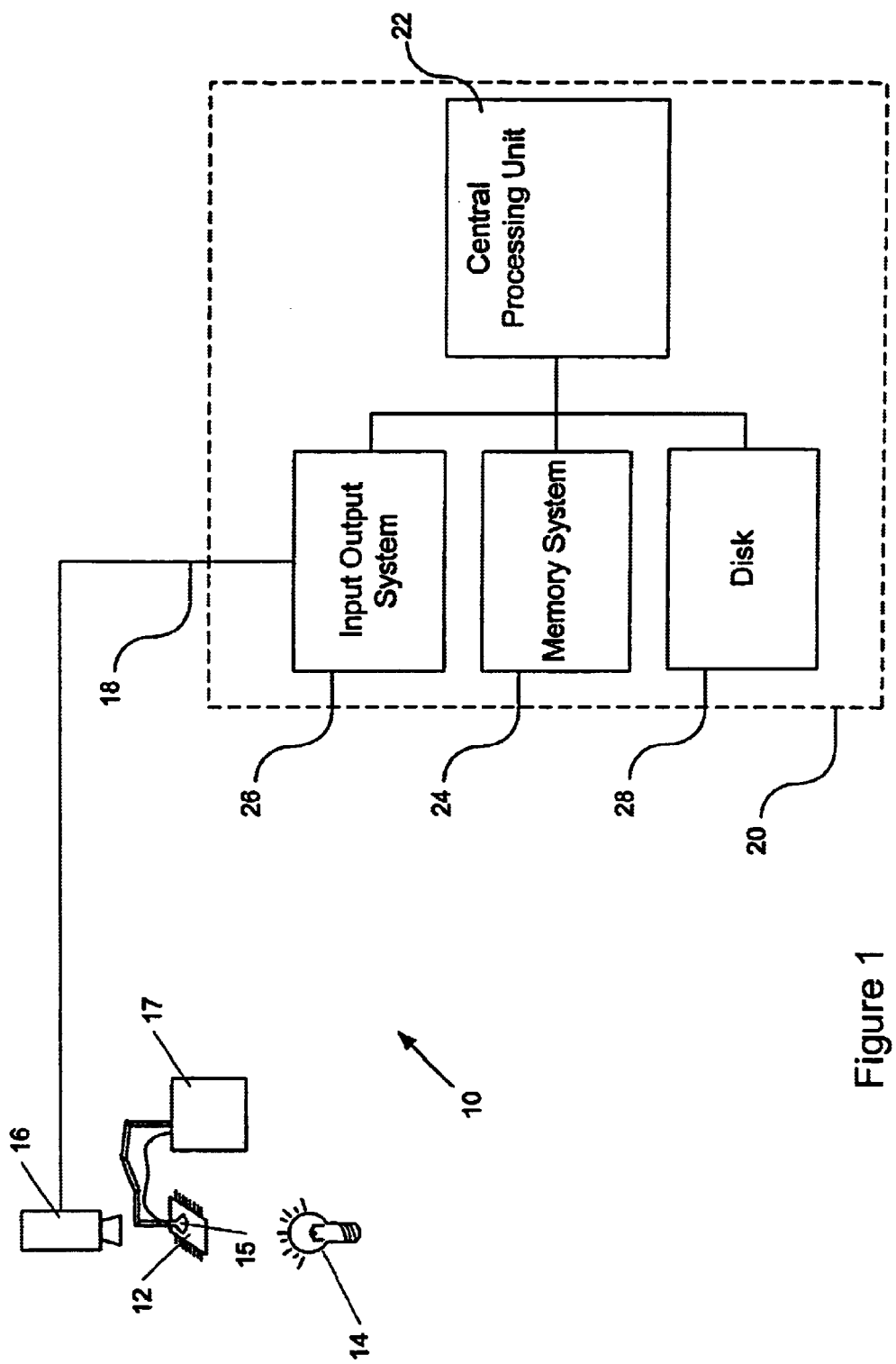
FIG. 1 depicts a machine vision system of the type used to practice the invention.

FIG. 1 illustrates a machine system 10 of the type in which the invention is practiced. The system 10 includes a capture device 16, such as a conventional video camera or scanner, that generates an image of an object 12 that is illuminated by source 14. Image data (or pixels) generated by the capture device 16 represents, in the conventional manner, the image intensity (e.g., color or brightness) of each point in the scene at the resolution of the capture device 16.

In the illustrated embodiment, the illumination source 14 and/or capture device 16 are arranged such that object 12 is backlit and, hence, that its silhouette is presented in images generated by device 16. Such an arrangement is preferable in applications such as semiconductor fabrication or electronic parts assembly, e.g., insofar as object features extraneous to coarse position and orientation determinations are inherently removed from the images. Those skilled in the art will, of course, appreciate that other illumination and imaging arrangement may be used.

Illustrated object 12 is a integrated circuit device, semiconductor "chip," surface mounted device (SMD), or other electronic circuit component of square, rectangular or other regular shape. For sake of convenience, such object is referred to as a chip or component throughout this application. The chip 12 is moved, manipulated or processed (collectively, "handled") by a suction nozzle 15 and robotic arm 17, or other by other handling apparatus (e.g., conveyor belts, etc.) of the type commonly used in the art in connection with the fabrication, assembly, and/or inspection of these and other small electronic devices.

The digital image data is transmitted from capture device 16 via a communications path 18 to an image analysis system 20. This can be a conventional digital data processor, or a vision processing system of the type commercially available, for example, from the assignee hereof, Cognex Corporation, programmed in accord with the teachings hereof to determine the position and/or orientation of chip 12. Such an image analysis system 20 may have one or more central processing units 22, main memory 24, input-output system 26, and disc drive (or other mass storage device) 28, all of the conventional type.

The system 20 and, more particularly, central processing unit 22, is configured by programming instructions according to the teachings hereof for determining the position and/or orientation of, as well as to inspect, an object shown in image acquired by capture device 16, as described in further detail below. Those skilled in the art will appreciate that, in addition to implementation on a programmable digital data processor, the methods and apparatus taught herein can be implemented in special purpose hardware.

Figure 2A:
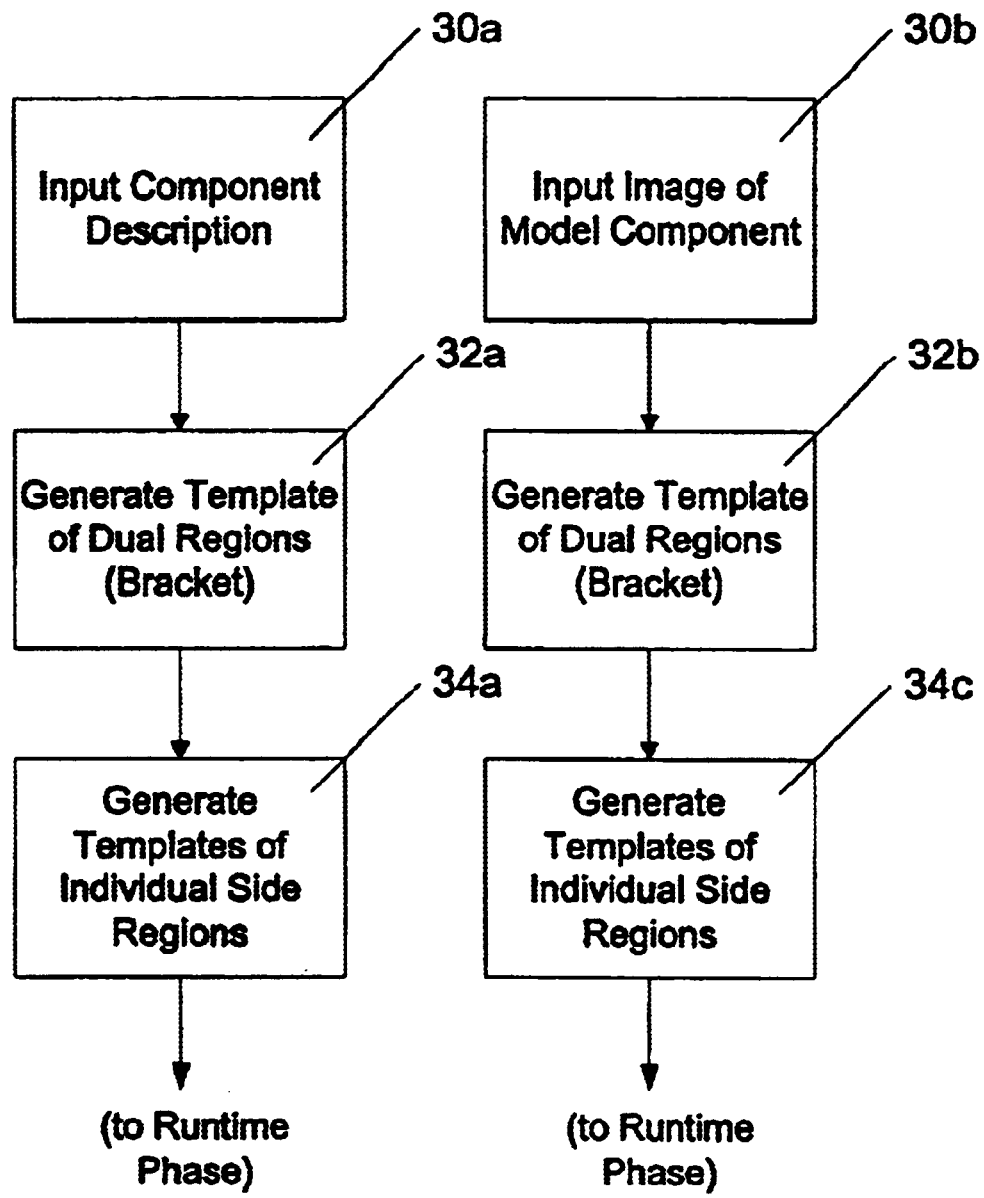
FIGS. 2A–2B are flow charts illustrating a method according to the invention for training and runtime operation of a system for determining the position and orientation of a semiconductor chip or other component.
Figure 2B:
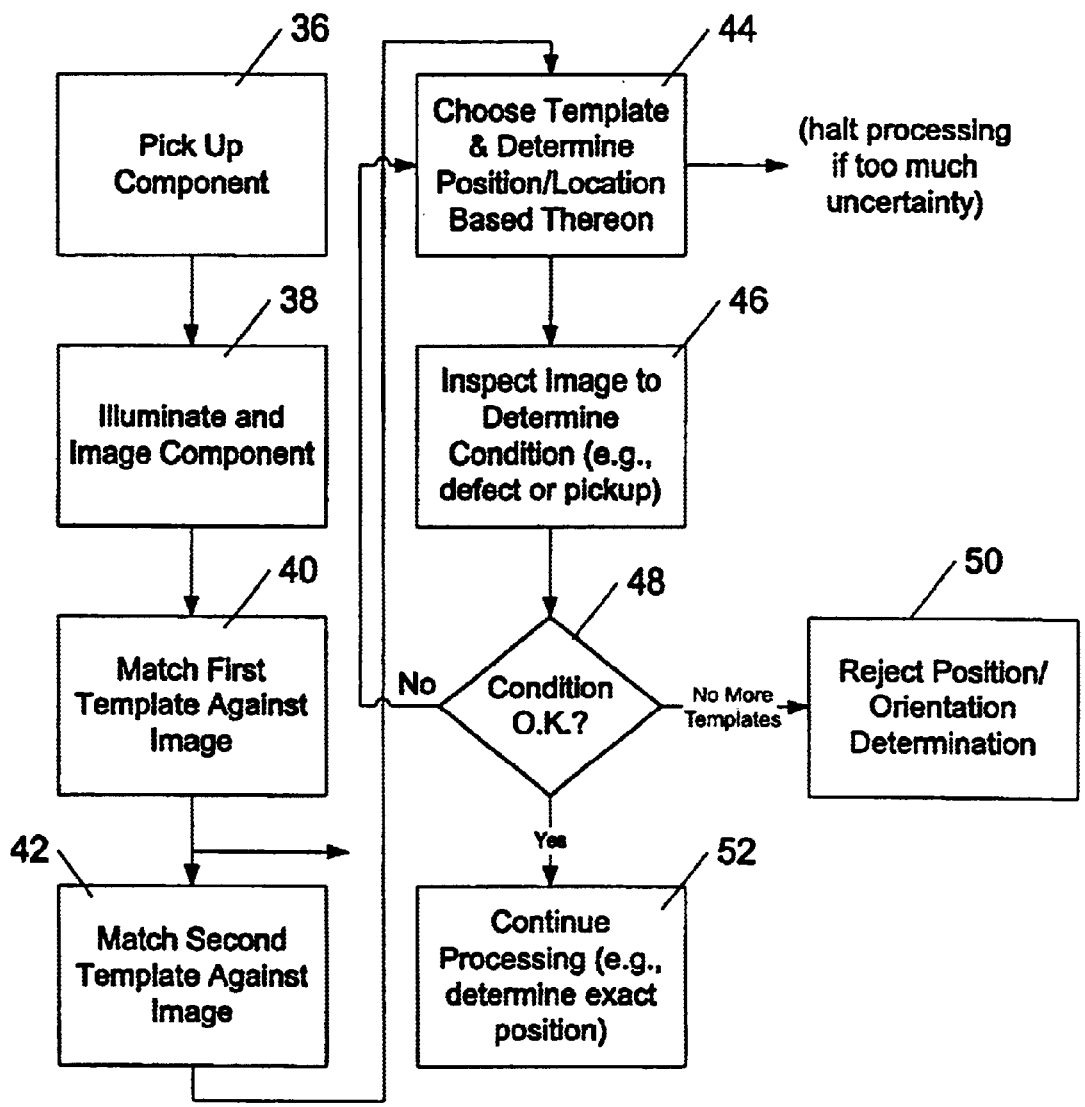

FIGS. 2A–2B are flow charts illustrating operation of a method according to the invention. Training operations are shown in FIG. 2A; runtime, in FIG. 2B.

Figure 3B:
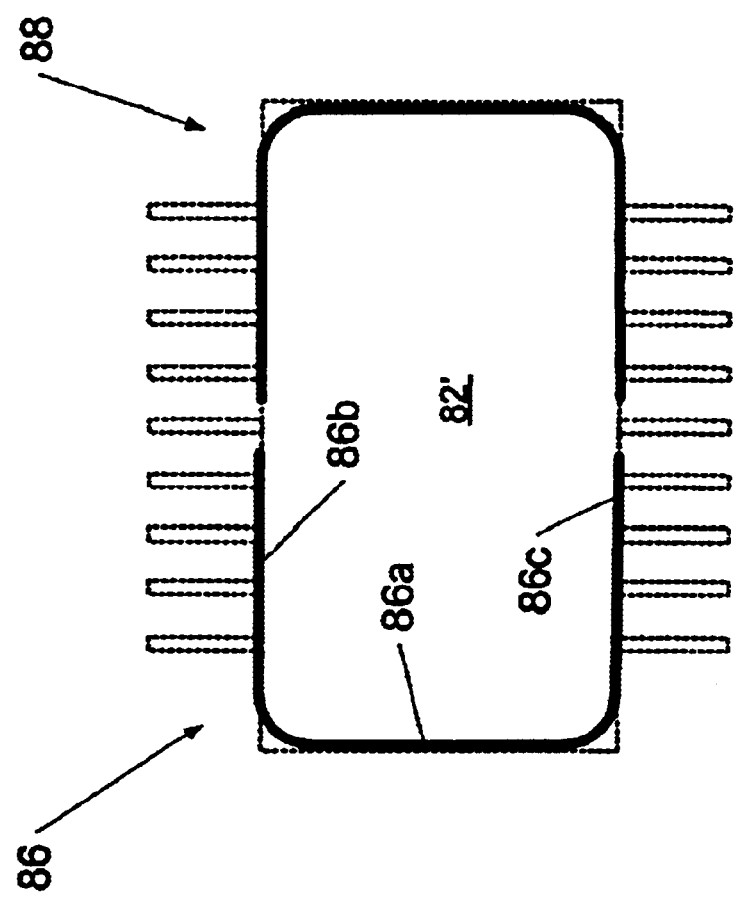
FIGS. 3A, 3B depict templates of the type generated during a training phase and used during a runtime phase to model and find, respectively, selected side regions of a component.
Figure 3A:
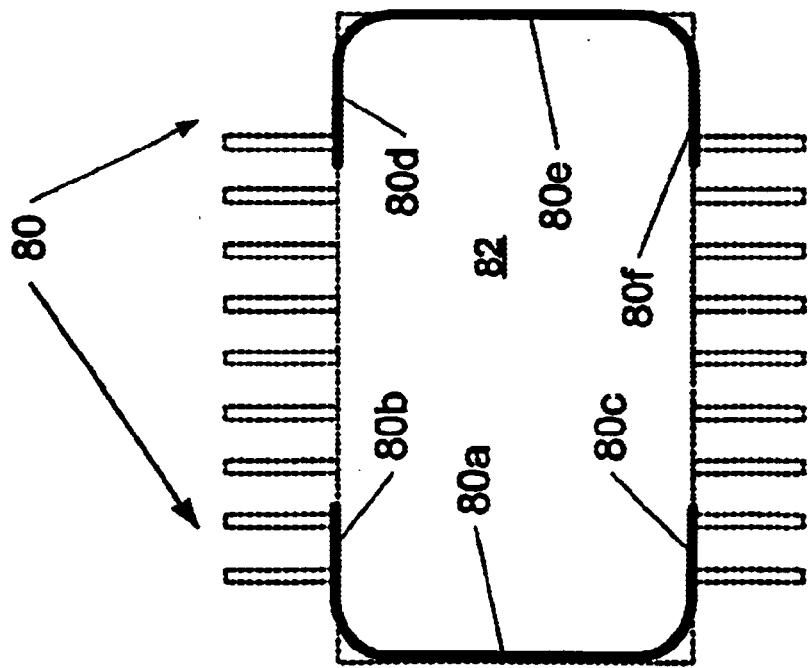

Referring to FIG. 2A, training operations illustrated in steps 30–34 are typically run prior to actual inspection of a component. During training, the method generates templates or patterns depicting one or more portions of a model component 82 of the type shown in FIGS. 3A and 3B. In the illustrated embodiment, those portions are individual or multiple side regions of square, rectangular or other rectilinear components such as semiconductor chips. Templates or patterns used in other embodiments may model other portions of the model and runtime objects under inspection.

As used herein, a side region comprises the border or edge on one side of the component and, preferably, also on nearby portions of one or two adjacent sides. In addition to a border or edge on one side of the component, a side region may include—in addition to or instead of nearby portions of one or two adjacent sides borders or edges of corners that define the transition to such adjacent sides.

In step 30A, a mathematical, algorithmic, symbolic or other description of the model component 82 is entered, e.g., via keyboard, or otherwise. Such descriptions are well known in the art as means of describing components and other objects being modeled and/or inspected.

Referring to step 32a, pattern or template 80 is generated depicting each of two side regions of model component 82. This template can be embodied in a bit map, mathematical, algorithmic, symbolic or other representation. The sides of the component 82 selected as the basis for the template are selected by the operator, by default, or otherwise. In the illustration, template 80 depicts the "left" and "right" side regions of the component.

The template includes portions 80a, 80e representing the principal sides of the respective selected side regions. The template also includes portions 80b, 80c, 80d, 80f, as illustrated, representing nearby portions of two sides adjacent each principal side, as illustrated. For square, rectangular, or other such components, the template 80 is generally bracket-shaped, as illustrated. If the template is based on fewer sides (e.g., if it includes only portions 80a and 80d) and/or where the template is generated from and for components of different shape (e.g., hexagonal), the template may have a different shape.

In the illustrated embodiment, the extent of the respective sides of component 82 modeled by template portions 80a–80f can vary depending on the application. In the illustrated embodiment, the principal side portions of the template, e.g., 80a, 80e, model a majority, e.g., over 50% and, preferably, over 80%, of the respective selected side. The other portions, e.g., 80b, 80c, 80d, 80f, model substantially less than all of the respective adjacent sides, e.g., under 40%.

Referring to step 34a, pattern or template 86 is generated depicting one side region. As above, this template can be embodied in a bit map, mathematical, algorithmic, symbolic or other representation of the side regions. The side of the component 82 selected as the basis for the template is also chosen by the operator, by default, or otherwise. In the illustration, template 86 depicts the "left" side of the component. A template 88 depicting the "right" side of the component is similarly generated.

The template includes portion 86a representing the principal side of the selected side region. The template also includes portions 86b, 86c, as illustrated, representing nearby regions of two sides adjacent each selected side, as illustrated. For square, rectangular, or other such components, the template 86 is generally U-shaped, as illustrated. If the template is based on fewer sides (e.g., includes only portions 86a and 86b) and/or where the template is generated from and for components of different shape (e.g., hexagonal), the template may have a different shape.

In the illustrated embodiment, the extent of the respective sides of component 82 modeled by template portions 86a–86c can vary depending on the application. In the illustrated embodiment, the principal side portion of the template, e.g., 86a, models a majority, e.g., over 50% and, preferably, over 80%, of the respective selected side. The other portions, e.g., 86b, 86c, model substantially less than all of the respective adjacent sides, e.g., under 60%.

As an alternative to generation of templates based on mathematical, algorithmic, symbolic or other descriptions of the model component 82, such templates can also be generated from images of model components. This is illustrated in parallel steps 30b–34b. Here, one or more model components are illuminated (e.g., via backlighting) and imaged to generate sample images. Sides of those images are selected, e.g., via an operator, by default, or otherwise, for purposes of template generation. Edge information is extracted, interpolated and/or extrapolated from the images in the conventional manner in order to generate templates of the type described above in connection with steps 32a–34a and FIGS. 3a, 3b.

Those skilled in the art will appreciate that, in addition to patterns or templates that model edges of the component 82, "don't care" regions may also be generated, e.g., in steps 32a–34c, in order to facilitate subsequent runtime processing.

In the illustrated embodiment, patterns 80, 86, 88 are selected (e.g., by the operator, by default, or otherwise) in order to model one or more respective portions (to wit, side regions) of the model component 82. Though the patterns differ from one another, they can (and, in the illustrated embodiment, do) model common portions of the object, e.g., pattern 80 models sides of the component that are also modeled (albeit to different degrees) by patterns 86, 88, respectively. The patterns are preferably selected so that at least one of them, individually, or two or more of them, in combination, matches (e.g., with an acceptably high degree of matching) at least a majority—if not substantially all—of the expected "visible" portions of a runtime object 12 under expected conditions of execution of the method.

Thus, where the method is executed, e.g., as discussed in connection with FIGS. 2A–2B and 4A–4E, for purposes of determining the position and orientation of a chip 12 handled by a suction nozzle, at least one of patterns 80, 86, 88 individually (or two or more, in combination) will match a majority—and, preferably, substantially all—"visible" portions of the chip (e.g., portions that are not obscured by the nozzle) in a backlit image. This is true regardless of whether the suction nozzle lands in the middle of the chip or toward either side.

The runtime phase of operations of a system according to the invention is depicted in FIG. 2B, beginning at step 36. Here, a component 12 is picked up, acquired, manipulated and/or moved by a suction nozzle or other handling apparatus of the type described above in connection with elements 15 and 17 of FIG. 1. In step 38, the component 12 is illuminated and imaged in the manner discussed above in connection elements 14 and 16 of FIG. 1. Thus, for example, a component 12 acquired by handling apparatus 15 is backlit and imaged by a camera 16.

In steps 40 and 42, the templates 80–88 are matched against the image in sequence, i.e., to find image portions best matching the patterns represented by those templates. Pattern finding is limited, in some embodiments, to matching against the image a template modeling only one side region of the component, e.g., template 86; in other embodiments, a pattern or sequential patterns representing two side regions of the component, e.g., template 80; and, in still other embodiments, a pattern or sequential patterns representing n side regions, where n is less than the number of side regions of the component expected to be shown in the image.

Template matching is performed in the conventional manner known in the art. Results of such matching are the location and orientation of portions of the image best matching the respective templates. Exemplary techniques for template matching include correlation techniques (such as normalized correlation), among others. A preferred technique for template matching is edge-based matching such as provided by the PATMAX™ tool commercially available from the assignee hereof.

In step 44, an overall location and orientation of the component 12 is estimated from the template that best matched the image. In the event that the uncertainty of all of the template matches is too great (as determined empirically in accord with the template matching techniques used and the demands of the specific application), the operator is alerted and processing halts, as appropriate or desired. In some embodiments, a match other than that which produced the highest degree of match is initially selected. Thus, for example, overall location of component 12 may be based on "bracketing" template 80, so long as it achieves at least a minimal degree of matching—and even if it produces a lower matching score than templates 86, 88.

In step 46, the image is optionally analyzed to determine a condition of the component, e.g., to identify defects and/or to determine a miscue in component pickup or other handling. As noted above, the pickup condition is state of the component during or as a consequence of handling. It includes, by way of non-limiting example, the location of the suction nozzle (or other handling apparatus) with respect to the component, whether the component is being held at an "off" angle, and so forth.

In a preferred embodiment, the method of step 46 includes inspecting the image in the region of the template that best matched—or, in the case that prior inspection has resulted in discarding results attained with that template, in the region of one of the templates with the next best acceptable match. Thus, for example, if template 80 is selected as the basis for component position/orientation determination, inspection proceeds by examining edge points on both the left and right sides of the component 12. If the inspection reveals a missing or extra corner, an inconsistent edge orientation, an inconsistent line segment orientation, or any other condition suggesting a miscue in handling or defect in the component, then the match is discarded and processing proceeds through step 48 to step 44 for selection of the next template (if any) with an acceptable degree of match.

With respect to line segment orientation, the illustrated embodiment fits a line to sequential tuples of edges within the image. Line segments are considered only if the RMS of a fitted line is less than a designated threshold. A potential defect or bad pickup condition is signaled if the angle of any line segment differs from expectation by more than a threshold value.

The illustrated embodiment also inspects corners of the imaged object 12 in the region of the selected template. In this regard, it fits line segments, as discussed immediately above, to the points in that region. The estimated position of each expected corner is determined based on the position/ orientation estimated in Step 44. If the closest point to such an estimated corner on one of those line segment is "inside" that line segment and if the distance between that closest point and the estimate corner is greater than a threshold value, then the corner is deemed to be missing and processing proceeds through step 48 to step 44 for selection of the next template, if any, with an acceptable degree of match.

The illustrated method also searches the image to detect unexpected edges within the imaged component 12. This can be done by searching for edge transitions within the expected region bounded by the component, whose position/ orientation is estimated from the selected template. Preferably, the search region is slightly smaller than the estimated extent of the component, e.g., to avoid improper edge detection. The illustrated embodiment also inspects all sides (e.g., "left", "right", "top", and "bottom") of the imaged object 12 in order to insure that they have expected orientations, typically, horizontal or vertical (i.e., with respect to the principal axes of the imaged component). To this end, the method fits line segments, as discussed immediately above, to the edge points in the image at the expected location of the component. It then verifies that those fit line segments are within expected tolerances, e.g., of relative horizontal and vertical, and, if not, the match is deemed improper. In this event, or if unexpected edges are found within the imaged component, processing proceeds through step 48 to step 44 for selection of another template match (if any). The number of points in the line segments and the tolerances can be adjusted, as appropriate, in accord with side under inspection and the selected template.

In step 46, the illustrated method optionally searches the image to determine the location of the suction nozzle or other handling apparatus with respect to the body of component 12. This can be done by matching a template (not shown) depicting the nozzle or other handling apparatus against the image or, alternatively, by identifying edge points, e.g., on or near the estimated location of the component 12, likely to represent the nozzle or other apparatus. In the event the suction nozzle or other apparatus is determined to be positioned in a location likely indicative of a bad pickup (e.g., miscue) or of other mishandling. In this case, processing proceeds through step 48 to step 44 for selection of another acceptable template, if any.

In the scenarios discussed above, the operator can be notified, the component 12 discarded and/or processing halted, as appropriate or desired, once all templates that have matched the image to an acceptable degree have been exhausted. Alternatively, in step 52, the estimates are retained and processing proceeds, e.g., by passing the estimates on to further machine vision software or hardware tools, as necessary or desired.

FIGS. 4A–4B depicts images of the type analyzed in step 46 in which the imaged component 12 appears, and the suction nozzle is positioned, so as to suggest a "good" pickup. Depending upon the implementation, analysis of such images in step 46, would result in continuing processing via step 52. Those skilled in the art will, of course, appreciate that variants of these images, and others as well, may be equally suggestive of "good" pickups, whether by suction nozzles or other pickup apparatus.

FIG. 4C depicts an image of the type analyzed in step 46 in which there is a condition that suggests a "bad" pickup. In this illustration, edges internal to the component (i.e., a throat 15*a* of the nozzle) are indicative of the bad pickup or, alternatively, of a defective component. Depending upon the implementation, analysis of such an image in step 46, would result in discarding of the estimates per step 50.

In addition to the foregoing, step 46 identifies extraneous or missing corners that, too, are indicative of a bad pickup.

Images depicting such pickup are shown in FIGS. 4D (extra corner 12e) and 4E (missing corner 12f). As above, depending upon the implementation, analysis of such images in step 46, would result in discarding of the estimates per step 50.

Those skilled in the art will, of course, appreciate that variants of these images, and others as well, may be equally suggestive of "bad" pickups or defective components.

Described above are methods and apparatus meeting the desired objects. Those skilled in the art will appreciate that the embodiments shown herein are merely illustrative and that other embodiments, incorporating changes therein, are within the scope of the invention. In view thereof,

What we claim is:

1. A machine vision method for determining any of a location and an orientation in an image of an electronic component handled by a suction nozzle or other part-handling apparatus, the method comprising the steps of:
   A. performing plural times a step of matching a pattern with the same image, each time matching a different pattern, each pattern modeling one or more respective portions of the electronic component,
   B. each matching step including the steps of (i) finding a location, if any, of the respective pattern in the image, (ii) determining a degree of match between the respective pattern and the image, (iii) determining any of a position and an orientation of the electronic component based on results of the matching step, wherein the patterns are selected so as to match, individually or in combination, at least a majority of expected imaged portions of the electronic component under expected conditions of execution of the method,
   C. the performing step including (i) inspecting the image to determine a condition of the electronic component as a result of any of a defect in the component and an error in handling of the component by the suction nozzle or other part-handling apparatus, and (ii) rejecting a determination of any of a position and an orientation of the electronic component based on its condition,
   D. the inspecting step including determining a condition of the electronic component as a result of handling by the suction nozzle or other part-handling apparatus by, any of (i) finding in the image a shape corresponding to a part-handling apparatus, and (ii) finding in the image a shape corresponding to a suction nozzle.

2. The method of claim 1, wherein
   a first pattern models at first side region of the electronic component, and
   a second pattern models a second side region of the electronic component, and
   a third pattern models the first side region of the electronic component and the second side region of the electronic component.

3. The method of claim 1, wherein the patterns are selected so that at least one of them is likely to be found in the image under expected conditions of execution of the method.

4. The method of claim 3, wherein the patterns are selected so that at least one of them is likely to be found in the image with an acceptable degree of match under expected conditions of execution of the method.

5. The method of claim 1, wherein each pattern models one or more respective side regions of the component, each side region comprising a respective side edge of the component and any of
   (i) a portion each of one or more side edges adjacent each respective side edge, and
   (ii) one or more corners that define a transition to one or more such adjacent sides edges.

6. The method of claim 5, wherein
   a first pattern models a first side region of the component, and
   a second pattern models any of
      (i) a second side region of the component, and
      (ii) the first side region of the component and a second side region of the component.

7. The method of claim 5, wherein
   a first pattern models a first side region of the component, and
   a second pattern models a second side region of the component, and
   a third pattern models the first side region of the component and the second side region of the component.

8. The method of claim 1, wherein the step of determining any of a position and an orientation is based on one or more factors including (i) a characteristic of the pattern, and (ii) a degree of match between a pattern and the image.

9. The method of claim 8, wherein
   a first pattern models a first side region of the component,
   a second pattern models a second side region of the component,
   a third pattern models the first side region of the component and the second side region of the component,
   the step of determining any of a position and an orientation is based on one or more factors including (i) a characteristic of the pattern, namely, whether it models a single side region or whether it models multiple side regions, and (ii) a degree of match between a pattern and the image.

10. The method of claim 1, wherein the step of rejecting a determination of any of a position and an orientation of the electronic component includes the steps of
   rejecting a determination of any of position and orientation of the electronic component based on a found location of a first pattern in the image, and
   determining any of position and orientation of the electronic component based on a found location of a second pattern in the image.

11. The method of claim 1, including the steps of
   manipulating the electronic component with a suction nozzle or other part-handling apparatus, and
   wherein the inspecting step includes determining a part-handling condition of the electronic component.

* * * * *